March 11, 1930. J. W. CHASON 1,750,569
HUMIDIFYING APPARATUS
Filed June 11, 1928 2 Sheets-Sheet 2
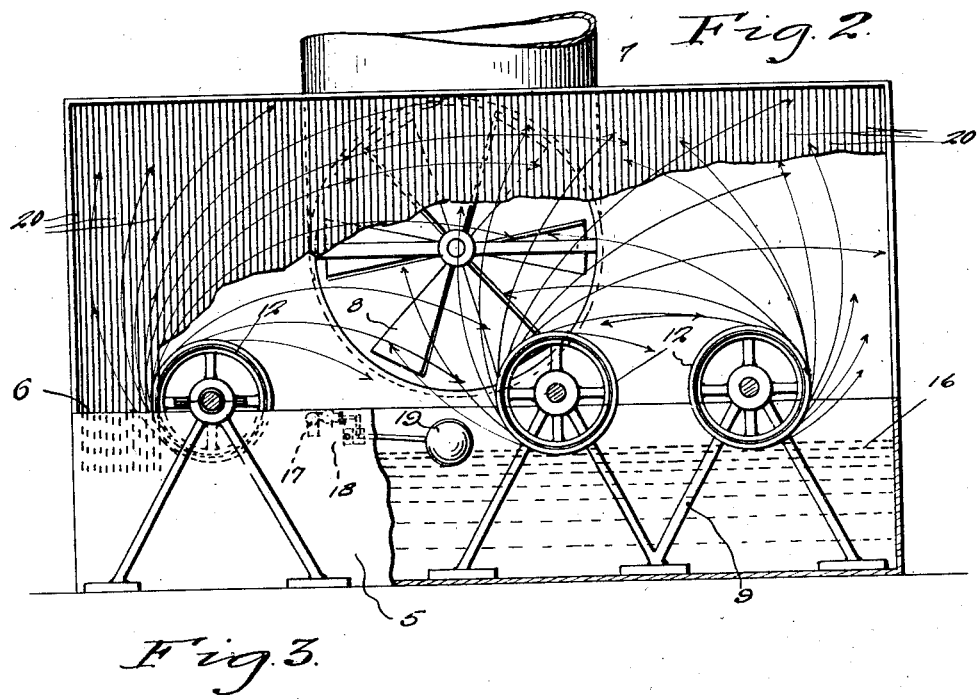
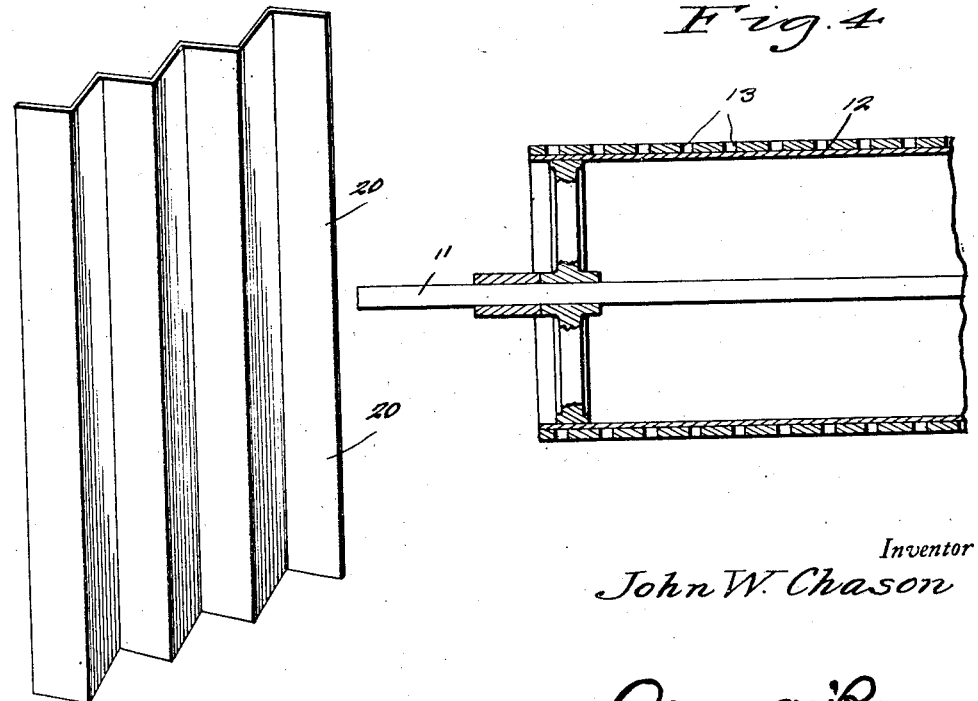
Inventor
John W. Chason
By Clarence A. O'Brien
Attorney Patented Mar. 11, 1930

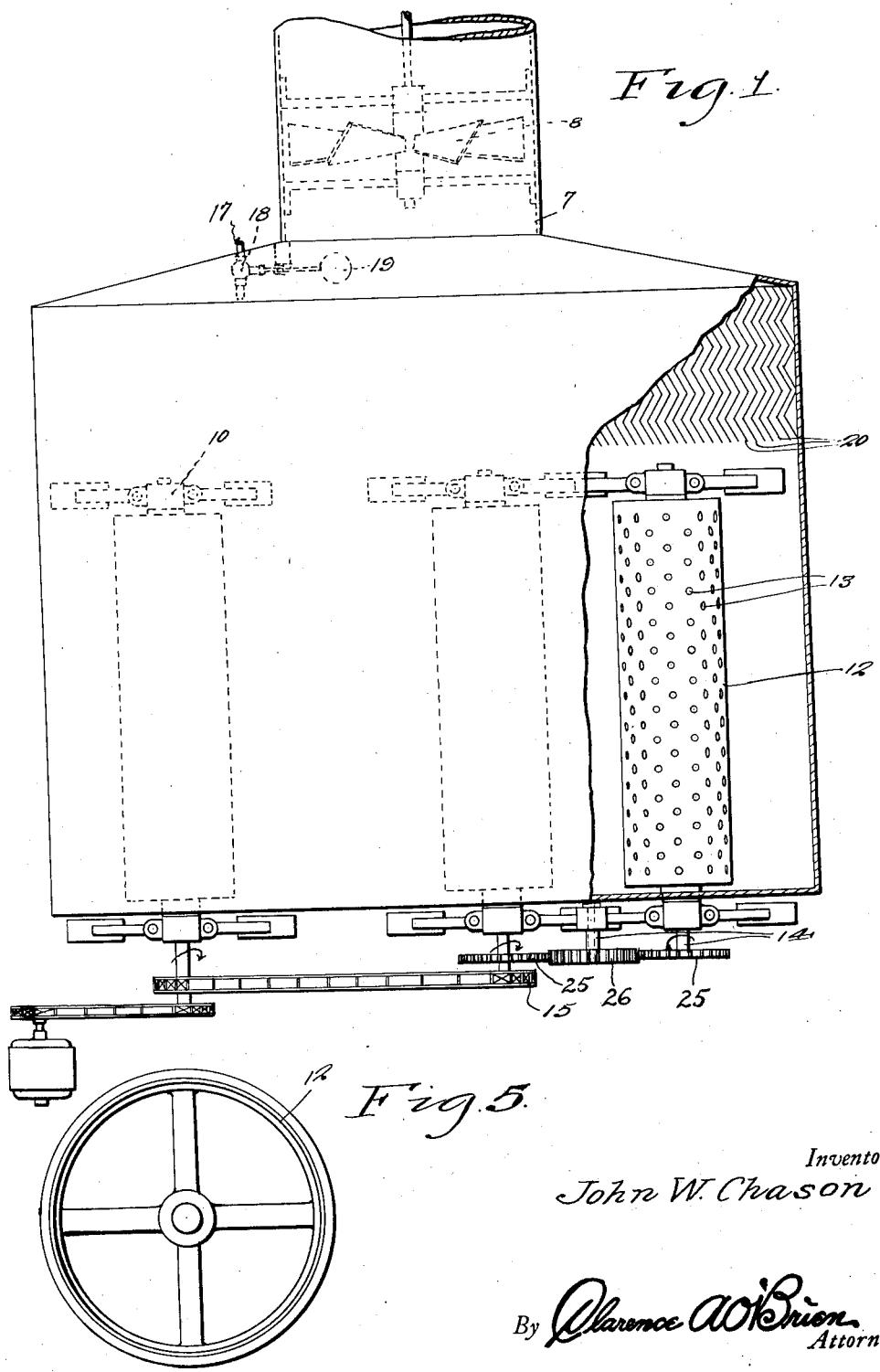

1,750,569

UNITED STATES PATENT OFFICE

JOHN W. CHASON, OF CHANDLER, ARIZONA

HUMIDIFYING APPARATUS

Application filed June 11, 1928. Serial No. 284,616.

The present invention relates to humidifying apparatus and has for its principal object to provide a means for directing the supply of air entering the building through a liquid spray whereby to wash and cool the air.

A still further object is to provide a liquid spray tank having air intake and discharge ports formed at opposite sides thereof with means arranged therein, for forming a film of spray through which the air is directed and interposing a series of baffle plates between the spray and the discharge port of the tank and between which baffles the air is arranged to pass for the purpose of removing all moisture from the air before leaving the tank for entering the room of the building.

A still further object is to provide a spray tank adapted to contain a quantity of liquid in its lower portion and providing a plurality of drums mounted for rotation within the tank and partially submerged in said liquid, whereby through the rotation of said drum to create a spray within the upper portion of said tank through which the air may be directed and to provide a means for automatically maintaining the liquid within the lower portion of the tank at a predetermined level.

A still further object is to provide an apparatus of this character of a simple and practical construction, which is efficient and reliable in performance, inexpensive to manufacture and maintain in operation and otherwise well adapted to the purpose for which it is intended.

Other objects of the invention will become apparent as the nature of the invention proceeds, and when considered in connection with the accompanying drawings, forming a part hereof.

In the drawing:

Figure 1 is a top plan view of the spray tank with parts broken away and shown in section, and illustrating the relative position of the parts arranged therein, Figure 2 is a front elevational view with a portion of the front wall of the tank broken away and shown in section, Figure 3 is a perspective view of one of the baffle plates, Figure 4 is a fragmentary longitudinal sectional view through one of the spray drums, and Figure 5 is an end elevational view thereof.

Referring now to the drawings in detail, wherein for the purpose of illustration I have disclosed a preferred embodiment of my invention, the numeral 5 designates the spray tank of substantially rectangular formation having the upper portion of its front wall open as shown at 6 and provided with the air discharge pipe 7 communicating with the rear of the tank.

Within the air discharge pipe 7 is operatively mounted a suction fan 8, for the purpose of drawing air into the tank through the opening in the front wall thereof and outwardly therefrom through the discharge pipe 7. Within the tank is arranged a series of upwardly extending supports 9 having bearing brackets 10 formed at the upper ends thereof and within which the adjacent ends of shafts 11 are journaled for rotation.

Upon each of the shafts 11 is mounted the drum 12 for rotation therewith, the drums having their walls formed with a series of perforations 13. The shafts 11 are disposed in spaced parallel relation with one end of each thereof extending outwardly from the front portion of the tank as shown at 14, and provided with sprocket wheels 15 around which the drive chain may be extended for operating the drums from a suitable source of power. Two gear wheels 25 are secured to the projecting portions 14 of two adjacent shafts 11. An idler gear wheel 26 is interposed between the two gears 25 for rotating the two adjacent drums carried by the shafts in opposite directions.

Preferably, the chain is connected with the sprocket wheels 15, so as to provide for the opposite rotation of the drum, for a purpose as will more fully hereinafter be explained. The lower portion of the tank 5 is formed into a liquid tight reservoir, within which a quantity of water or other liquid shown at 16 may be retained and of sufficient depth to enable the drums 12 to be partly submerged therein.

Accordingly, upon the rotation of the drums at a predetermined speed, the surface thereof will pick up a quantity of the liquid and through centrifugal action will discharge the water from the drum upwardly into the upper portion of the tank as indicated by the arrows shown in Figure 2 of the drawings, whereby to form a spray extending entirely throughout the area of the upper portion of the tank.

By reversing the direction of rotation of certain of the drums, the said spray in the upper portion of the tank will be more completely formed. The water or other liquid is fed into the lower portion of the tank by means of a feed pipe 17, communication through said pipe being controlled by a valve 18 of conventional construction and operated by a float 19, for maintaining the water at a predetermined level.

At the rear portion of the tank, between the rear ends of the drums 12 and the discharge pipe 7 is arranged a series of baffle plates 20, disposed vertically in uniformly spaced relation with respect to each other and having their surfaces constructed of a zig-zag formation.

The lower ends of the baffle plates 20 are submerged in the liquid 16, so that it is necessary for the air passing through the tank to travel between the baffle plates.

By reason of the zig-zag formation of the baffle plate, a tortuous passage for the air is thus provided, and accordingly as the same is drawn between the plates by the suction of the fan, the moisture picked up by the air in passing through the spray will strike against the surfaces of the baffle plate and adhere thereto.

Therefore, after leaving the baffle plate the air is free from moisture and will accordingly become substantially dry by the time the air reaches the fan 8, for discharging into a room or other enclosed area with which the discharge pipe 7 may communicate.

It will be apparent from the foregoing that an efficient and beneficial humidifying apparatus is provided for the rooms of buildings, theatres, and similarly closed places for efficiently purifying the air and leading the same into the building. It will also be understood that the liquid 16 may be maintained at a suitable temperature for cooling the air passing through the tank, either by cooling the liquid in a suitable manner before feeding the same into the tank or by providing cooling coils of a character well known in the art within the liquid reservoir.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

A humidifying apparatus comprising a spray tank having a liquid reservoir formed in its lower portion and provided with air intake and discharge openings at its opposite sides and above said reservoir, a plurality of spray drums rotatably mounted in the tank and with a portion of each drum submerged in the liquid of the reservoir and adapted through the rotation thereof to form a spray in the upper portion of the tank, a suction fan mounted adjacent to the air discharge opening and arranged above said drums and at one end thereof, whereby to cause a movement of the air longitudinally thereof, one of said drums being arranged adjacent to one end of the tank, and the other drums being in spaced relation adjacent to the opposite end of the tank, means for rotating the first mentioned drum, means for rotating one of the last mentioned drums from the first mentioned drum, said last mentioned drums being provided each with a gear wheel, and an idler wheel meshing with said gear wheels for causing the rotation of the last mentioned drums in opposite directions.

In testimony whereof I affix my signature.

JOHN W. CHASON.